Aug. 14, 1951   J. L. STARK   2,564,216
DOUGH HOLDING ATTACHMENT FOR FISHHOOKS
Filed Nov. 9, 1948

INVENTOR.
John L. Stark
BY
FISHER AND CHRISTEN
ATTORNEYS

Patented Aug. 14, 1951

2,564,216

UNITED STATES PATENT OFFICE 2,564,216

DOUGH HOLDING ATTACHMENT FOR FISHHOOKS

John L. Stark, Cedar Rapids, Iowa

Application November 9, 1948, Serial No. 59,094

1 Claim. (Cl. 43—44.8)

This invention relates to fishing equipment, and more particularly to an attachment for fish hooks for holding dough-type baits onto the hook.

It is a general object of my invention to provide an attachment for fish hooks which will form a framework or skeleton around which dough-type baits can be moulded so that the bait will not become easily lost in casting and when subjected to the washing action of the fishing waters.

It is a further object of my invention to provide an attachment for fish hooks for holding dough bait to the fish hook which is designed to be readily assembled to or disassembled from a standard type fish hook.

It is still another object of my invention to provide a dough bait retaining attachment for standard type fish hooks which is simple in construction and inexpensive to manufacture.

It is still another object of my invention to provide a dough bait retaining attachment for fish hooks which can be used singularly or in multiples depending on the length of the shank on the fish hook and the amount of bait the fisherman wishes to use.

It will be apparent upon consideration of the accompanying drawing and following specification, wherein is disclosed a preferred examplary embodiment of the invention, that changes may be made therein without departing from the spirit of the invention.

Referring now to the accompanying drawings.

Figure 1:
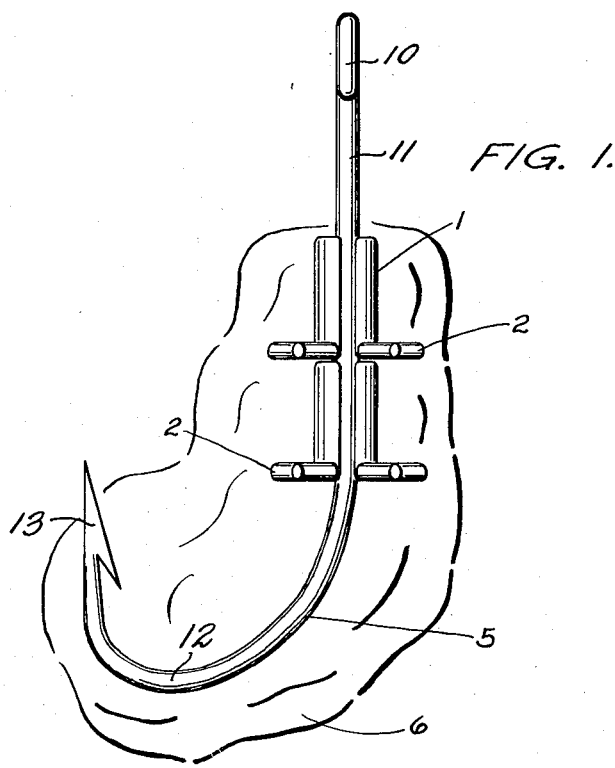
Figure 1 is a side elevational view of a standard type fish hook with two of my bait holding attachments mounted thereon, illustrating the method of use.
Figure 2:
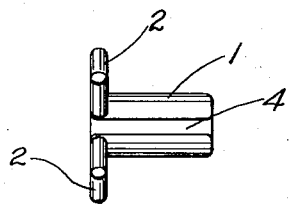
Figure 2 is a side view showing construction details of one of the bait holding attachments.
Figure 3:
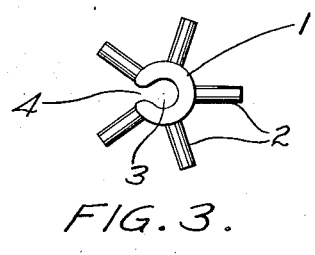
Figure 3 is an end view also showing construction details of one of the bait holding attachments.

Referring now to the drawing in which like reference numerals refer to like parts; a sheath or sleeve 1 has a plurality of fingers or projections 2 extending radially in spaced relation from said sleeve. Sleeve 1, of C-shape in cross section, has a longitudinal hole 3 of such a diameter as to fit snugly to the shank of a standard type fish hook 5, which is provided with an eye 10, a shank 11, a curved bill 12 and a barb 13 in the usual relationship. One side of sheath 1 has a slot 4 extending the full length of said sheath, said slot being smaller in width than the diameter of hole 3.

The sheath 1, together with fingers 2, is composed of a resilient material allowing slot 4 to be expanded to the diameter of the shank of the fish hook 5 when mounting the device on the fish hook. The slot 4 returns to its original size when the shank of the fish hook 5 seats itself in hole 3, the resilience of the material holding the device in position on the shank 11 between the eye 10 and curved bill 12 of the hook which serve as stops to limit the movement of sleeve 1 and maintain the sleeve and its projections always in proper relationship with the barb of the hook so that dough bait may hide the entire shank of the hook along with the sleeve, its projections and the barb.

The fingers 2 extending radially in spaced relationship from the sheath 1 provide a framework or skeleton around which the dough-type bait 6 can be moulded and secured to fish hook 5.

In its broad aspects, the invention includes modified forms of dough-bait securing means, and the invention is not necessarily limited to the preferred embodiment which utilizes a plurality of radially extending fingers projecting from one end of the C-shaped member. The dough-holding attachment is preferably molded of a suitable resilient plastic although other resilient materials such as steel, brass, wood, etc., may be used.

I claim as my invention:

In combination, a fish hook having a barb, a curved bill and substantially straight shank terminating in an eye, and a sleeve detachably and slidably mounted on the shank, said sleeve being of C-shape in cross section and inherently resilient, the outer surface thereof having projections extending radially therefrom, the inner width of the C-shaped sleeve corresponding substantially in width to the thickness of the shank whereby the curved portion of the bill constitutes a stop to maintain a spaced relation between the sleeve and the barb whereby a dough bait will be held on the hook by the sleeve and its projections.

JOHN L. STARK.

REFERENCES CITED

The following references are of record in the file of this patent:

UNITED STATES PATENTS

| Number | Name | Date |
|---|---|---|
| 699,397 | Lacey | May 6, 1902 |
| 1,062,726 | Nelson | May 27, 1913 |
| 1,249,342 | Dahl | Dec. 11, 1917 |
| 1,699,956 | Darrow et al. | Jan. 22, 1929 |
| 1,840,210 | Reekers | Jan. 5, 1932 |
| 2,273,582 | Maire | Feb. 17, 1942 |

FOREIGN PATENTS

| Number | Country | Date |
|---|---|---|
| 6,810 | Great Britain | A. D. 1900 |